(12) United States Patent
Yang (10) Patent No.: US 11,238,571 B2
(45) Date of Patent: Feb. 1, 2022

(54) METHOD AND DEVICE FOR ENHANCING IMAGE CONTRAST, DISPLAY APPARATUS, AND STORAGE MEDIUM

(71) Applicant: BOE TECHNOLOGY GROUP CO., LTD., Beijing (CN)

(72) Inventor: Jinglin Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 122 days.

(21) Appl. No.: 16/450,122

(22) Filed: Jun. 24, 2019

(65) Prior Publication Data
US 2020/0043148 A1 Feb. 6, 2020

(30) Foreign Application Priority Data
Aug. 1, 2018 (CN) .......................... 201810862423.2

(51) Int. Cl.
*G06K 9/00* (2006.01)
*G06T 5/00* (2006.01)
(Continued)

(52) U.S. Cl.
CPC ............... *G06T 5/009* (2013.01); *G06T 5/40* (2013.01); *G06T 5/50* (2013.01); *G06T 2207/20172* (2013.01); *G06T 2207/20221* (2013.01)

(58) Field of Classification Search
CPC .. G06T 5/009; G06T 5/40; G06T 5/50; G06T 2207/20172; G06T 2207/20221;
(Continued)

(56) References Cited

U.S. PATENT DOCUMENTS 5,687,249 A * 11/1997 Kato ....................... G08G 1/017
340/936
7,639,893 B2 * 12/2009 Duan ....................... G06T 5/007
345/589
(Continued)

FOREIGN PATENT DOCUMENTS

CN 103606137 * 4/2016
CN 106530237 * 3/2017 ............. G06T 5/009

*Primary Examiner* — Tom Y Lu
(74) *Attorney, Agent, or Firm* — Nath, Goldberg & Meyer; Joshua B. Goldberg (57) ABSTRACT

The present disclosure provides a method for enhancing image contrast, including: dividing an input image into a plurality of input sub-images, each of the plurality of input sub-images corresponding to a gray value distribution range, the gray value distribution ranges of the respective input sub-images being different from each other, and each input sub-image comprising all pixels, among pixels of the input image, whose gray values are within the gray value distribution range of the input sub-image; performing an equalization processing on each of the plurality of input sub-images, and obtaining a plurality of output sub-images corresponding to the plurality of input sub-images, respectively, based on a result of the equalization processing; and merging the plurality of output sub-images to obtain an output image corresponding to the input image. The present disclosure further provides a device for enhancing image contrast, a display apparatus, and a computer-readable storage medium.

13 Claims, 3 Drawing Sheets

DIVIDE AN INPUT IMAGE INTO A PLURALITY OF INPUT SUB-IMAGES — S1

PERFORME AN EQUALIZATION PROCESSING ON EACH OF THE PLURALITY OF INPUT SUB-IMAGES, AND OBTAIN A PLURALITY OF OUTPUT SUB-IMAGES CORRESPONDING TO THE PLURALITY OF INPUT SUB-IMAGES BASED ON A RESULT OF THE EQUALIZATION PROCESSING — S2

MERGE THE PLURALITY OF OUTPUT SUB-IMAGES TO OBTAIN AN OUTPUT IMAGE CORRESPONDING TO THE INPUT IMAGE — S3

(51) Int. Cl.
*G06T 5/40* (2006.01)
*G06T 5/50* (2006.01)

(58) Field of Classification Search
CPC ........... G06T 2207/20021; G06T 5/008; G06T 2207/10004
See application file for complete search history.

(56) References Cited

U.S. PATENT DOCUMENTS

| | | | | |
|---|---|---|---|---|
| 7,840,066 B1* | 11/2010 | Chen | ..................... | G06T 5/40 |
| | | | | 382/168 |
| 2005/0129310 A1* | 6/2005 | Herley | ................... | G06T 7/194 |
| | | | | 382/168 |
| 2007/0269132 A1* | 11/2007 | Duan | ..................... | G06T 5/40 |
| | | | | 382/274 |
| 2013/0279773 A1* | 10/2013 | Masumoto | ............... | G06T 5/50 |
| | | | | 382/128 |
| 2015/0043786 A1* | 2/2015 | Ohki | ..................... | G06T 7/215 |
| | | | | 382/107 |

* cited by examiner

METHOD AND DEVICE FOR ENHANCING IMAGE CONTRAST, DISPLAY APPARATUS, AND STORAGE MEDIUM

CROSS-REFERENCE TO RELATED APPLICATIONS

The present application claims the priority of Chinese Patent Application No. 201810862423.2 filed on Aug. 1, 2018, the contents of which are incorporated herein in by reference.

TECHNICAL FIELD

The present disclosure relates to the field of display technology, in particular, to a method for enhancing image contrast, a device for enhancing image contrast, a display apparatus, and a computer-readable storage medium.

BACKGROUND

Due to an influence of light from outside, imaging effect usually suffers from interference and an image is too bright or dark overall, which affects a processing on a target in a specific region in the image to a certain extent. For such problems, a traditional histogram equalization algorithm has a good effect when processing some images, but it cannot accurately maintain the brightness of an image, and the processed image is usually too bright.

SUMMARY

An object of the present disclosure is to provide a method for enhancing image contrast, a device for enhancing image contrast, a display apparatus, and a computer-readable storage medium. The method for enhancing image contrast can enhance contrast of an output image, and maintain good overall image brightness.

As an aspect of the present disclosure, a method for enhancing image contrast is provided. The method includes: dividing an input image into a plurality of input sub-images, each of the plurality of input sub-images corresponding to a gray value distribution range, the gray value distribution ranges of the respective input sub-images being different from each other, and each input sub-image including all pixels, among pixels of the input image, whose gray values are within the gray value distribution range of the input sub-image; performing an equalization processing on each of the plurality of input sub-images, and obtaining a plurality of output sub-images corresponding to the plurality of input sub-images, respectively, based on a result of the equalization processing; and merging the plurality of output sub-images to obtain an output image corresponding to the input image.

According to an embodiment of the present disclosure, the step of dividing the input image into the plurality of input sub-images includes: performing a histogram statistics on gray values of the pixels of the input image to obtain a histogram of the input image, wherein the histogram of the input image includes pixel information of the input image, and the pixel information of the input image includes a plurality of gray values and the number of pixels of the input image corresponding to each of the plurality of gray values; and dividing, according to the histogram of the input image, the input image into the plurality of input sub-images.

According to an embodiment of the present disclosure, the step of dividing, according to the histogram of the input image, the input image into the plurality of input sub-images includes: dividing, according to a division value, the input image into n input sub-images respectively corresponding to different gray value distribution ranges, the division value being equal to a total gray value of each input sub-image and obtained by using the following formula (1):

$$g = \frac{1}{n}G \tag{1}$$

in which, g is the division value of each input sub-image, and G is a total gray value of the input image.

According to an embodiment of the present disclosure, the step of performing the equalization processing on each of the plurality of input sub-images, and obtaining the plurality of output sub-images corresponding to the plurality of input sub-images, respectively, based on the result of the equalization processing includes: performing the histogram statistics on the gray values of the pixels of each input sub-image to obtain a histogram of the input sub-image, in which the histogram of the input sub-image includes pixel information of the input sub-image, and the pixel information of the input sub-image includes each of gray values within the gray value distribution range of the input sub-image and the number of pixels of the input sub-image corresponding to each of the gray values within the gray value distribution range; forming a first matrix by using the pixel information of the input sub-image; performing a histogram equalization processing on the first matrix to obtain an intermediate matrix corresponding to the input sub-image; performing a singular value decomposition (SVD) on the first matrix to obtain a first singular value mean corresponding to the first matrix; performing the SVD on the intermediate matrix to obtain a second singular value mean corresponding to the intermediate matrix; calculating and obtaining a ratio of the second singular value mean and the first singular value mean; and fitting the first singular value mean towards the intermediate matrix by using the ratio, to obtain an output submatrix, numerical values in the output submatrix being equal to gray values of pixels of an output sub-image corresponding to the input sub-image, respectively.

According to an embodiment of the present disclosure, the steps of performing the SVD on the first matrix and the intermediate matrix include: performing, in a case that the input image is divided into the n input sub-images, the SVD on $sub\_img_i$ and $sub\_img_i\_heq_i$ by using the following formulas (2) and (3):

$$sub\_img_i = U_i * S_i * V_i \tag{2}$$

$$sub\_img_i\_ = U\_heq_i * S\_heq_i * V\_heq_i \tag{3}$$

in which, i represents a serial number of the input sub-image, and is a natural number ranged from 1 to n, $sub\_img_i$ represents the first matrix formed by using pixel information of an i-th input sub-image, $sub\_img_i\_heq_i$ represents the intermediate matrix obtained by performing the histogram equalization processing on $sub\_img_i$, $U_i$ is a k×k matrix, $S_i$ is a k×1 matrix, $V_i$ is a 1×1 matrix, $U\_heq_i$ is a k×k matrix, $S\_heq_i$ is a k×1 matrix, $V\_heq_i$ is a 1×1 matrix, $S_i$ includes a singular value of $sub\_img_i$, and $S\_heq_i$ includes a singular value of $sub\_img_i\_heq_i$.

According to an embodiment of the present disclosure, the step of calculating and obtaining the ratio of the second singular value mean and the first singular value mean includes: obtaining the first singular value mean S_ mean$_i$ corresponding to sub_img$_i$ by calculating a mean value of $S^1$; obtaining the second singular value mean S_heq$_i$_mean$_i$ corresponding to sub_img$_i$_heq$_i$ by calculating a mean value of S_heq$_i$; and obtaining the ratio of the second singular value mean and the first singular value mean by using the following formula (4):

$$r = S\_heq_i\_mean_i / S\_mean_i \quad (4)$$

in which, r is the ratio of S_heq$_i$_mean$_i$ to S_mean$_i$. The step of fitting the first singular value mean towards the intermediate matrix by using the ratio, to obtain the output submatrix includes: obtaining the output submatrix sub_img_out$_i$ of the i-th input sub-image by using the following formula (5), the output submatrix sub_img_out$_i$ including pixel information of the output sub-image corresponding to the i-th input sub-image:

$$sub\_img\_out_i = U_i * (r * S_i) * V_i \quad (5).$$

According to an embodiment of the present disclosure, the step of merging the plurality of output sub-images to obtain the output image corresponding to the input image includes: merging output submatrices of the n output sub-images by using the following formula (6) to obtain an output matrix of the output image corresponding to the input image:

$$img\_out = \sum_{i=1}^{n} (\omega_i \times sub\_img\_out_i) \quad (6)$$

in which, $\omega_i$ represents a merging weight value and $\Sigma \omega_i = 1$, and img_out represents the output matrix including pixel information of the output image.

As another aspect of the present disclosure, a device for enhancing image contrast is provided. The device includes: an image division unit configured to divide an input image into a plurality of input sub-images according to gray values of pixels of the input image, each of the plurality of input sub-images corresponding to a gray value distribution range, the gray value distribution ranges of the respective input sub-images being different from each other, and each input sub-image including all pixels, among the pixels of the input image, whose gray values are within the gray value distribution range of the input sub-image; an image equalization unit configured to perform an equalization processing on each of the plurality of input sub-images, and obtain a plurality of output sub-images corresponding to the plurality of input sub-images, respectively, based on a result of the equalization processing; and an image merging unit configured to merge the plurality of output sub-images to obtain an output image corresponding to the input image.

According to an embodiment of the present disclosure, the image division unit includes: a histogram statistics subunit configured to perform a histogram statistics on the gray values of the pixels of the input image to obtain a histogram of the input image, in which the histogram of the input image includes pixel information of the input image, and the pixel information of the input image includes a plurality of gray values and the number of pixels of the input image corresponding to each of the plurality of gray values; and a sub-image division subunit configured to divide the input image into the plurality of input sub-images according to the histogram of the input image.

According to an embodiment of the present disclosure, the sub-image division subunit is configured to: divide the input image into n input sub-images respectively corresponding to different gray value distribution ranges according to a division value, the division value being equal to a total gray value of each input sub-image and obtained by using the following formula (1):

$$g = \frac{1}{n} G \quad (1)$$

in which, g is the division value of each input sub-image, and G is a total gray value of the input image.

According to an embodiment of the present disclosure, the image equalization unit includes: a histogram equalization processing subunit configured to: perform the histogram statistics on the gray values of the pixels of each input sub-image to obtain a histogram of the input sub-image including pixel information of the input sub-image, in which the pixel information of the input sub-image includes each of gray values within the gray value distribution range of the input sub-image and the number of pixels of the input sub-image corresponding to each of the gray values within the gray value distribution range; form a first matrix by using the pixel information of the input sub-image; and perform a histogram equalization processing on the first matrix to obtain an intermediate matrix corresponding to the input sub-image; a calculation subunit configured to: perform a singular value decomposition (SVD) on the first matrix to obtain a first singular value mean corresponding to the first matrix; perform the SVD on the intermediate matrix to obtain a second singular value mean corresponding to the intermediate matrix; and calculate and obtain a ratio of the second singular value mean and the first singular value mean; and a fitting subunit configured to fit the first singular value mean towards the intermediate matrix by using the ratio, to obtain an output submatrix, numerical values in the output submatrix being equal to gray values of pixels of an output sub-image corresponding to the input sub-image, respectively.

According to an embodiment of the present disclosure, the calculation subunit is configured to: perform, in a case that the input image is divided into the n input sub-images, the SVD on sub_img$_i$ and sub_img$_i$_heq$_i$ by using the following formulas (2) and (3):

$$sub\_img_i = U_i * S_i * V_i \quad (2)$$

$$sub\_img_i\_heq_i = U\_heq_i * S\_heq_i * V\_heq_i \quad (3)$$

in which, i represents a serial number of the input sub-image, and is a natural number ranged from 1 to n, sub_img$_i$ represents the first matrix formed by using pixel information of an i-th input sub-image, sub_img$_i$_heq$_i$ represents the intermediate matrix obtained by performing the histogram equalization processing on sub_img$_i$, $U_i$ is a k×k matrix, $S_i$ is a k×1 matrix, $V_i$ is a 1×1 matrix, U_heq$_i$ is a k×k matrix, S_heq$_i$ is a k×1 matrix, V_heq$_i$ is a 1×1 matrix, $S_i$ includes a singular value of sub_img$_i$, and S_heq$_i$ includes a singular value of sub_img$_i$_heq$_i$.

According to an embodiment of the present disclosure, the calculation subunit is configured to: obtain the first singular value mean S_mean$_i$ corresponding to sub_img$_i$ by calculating a mean value of $S_i$; obtain the second singular value mean S_heq$_i$_mean$_i$ corresponding to sub_img$_i$_heq$_i$ by calculating a mean value of S_heq$_i$; and obtain the ratio of the second singular value mean and the first singular value mean by using the following formula (4):

$$r = S\_heq_i\_mean_i / S\_mean_i \quad (4)$$

in which, r is the ratio of $S\_heq_{i}\_mean_i$ to $S\_mean_i$. The fitting subunit is configured to: obtain the output submatrix $sub\_img\_out_i$ of the i-th input sub-image by using the following formula (5), the output submatrix $sub\_img\_out_i$ including pixel information of the output sub-image corresponding to the i-th input sub-image:

$$sub\_img\_out_i = U_i * (r * S_i) * V_i \qquad (5).$$

According to an embodiment of the present disclosure, the image merging unit is configured to: merge output submatrices of the n output sub-images by using the following formula (6) to obtain an output matrix of the output image corresponding to the input image:

$$img\_out = \sum_{i=1}^{n} (\omega_i \times sub\_img\_out_i) \qquad (6)$$

in which, $\omega_i$ represents a merging weight value and $\Sigma\omega_i=1$, and img_out represents the output matrix including pixel information of the output image.

As another aspect of the present disclosure, a display apparatus including a display panel and the device for enhancing image contrast according to the present disclosure is provided.

As another aspect of the present disclosure, an apparatus including at least one processor and a memory for storing at least one program is provided. When the at least one program is executed by the at least one processor, the at least one processor performs the method for enhancing image contrast according to the present disclosure.

As another aspect of the present disclosure, a computer-readable storage medium storing a computer program thereon is provided. When the computer program is executed by a processor, the processor performs the method for enhancing image contrast according to the present disclosure.

BRIEF DESCRIPTION OF THE FIGURES

The above and other aspects of the present disclosure will become more apparent by describing the exemplary embodiments of the disclosure in detail with reference to the drawings. In the drawings.

DETAILED DESCRIPTION

Specific embodiments of the present disclosure will be described in detail below with reference to the accompanying drawings. It should be understood that the specific embodiments described herein is only intended to illustrate and explain the present disclosure, instead of limiting the present disclosure.

Figure 1:
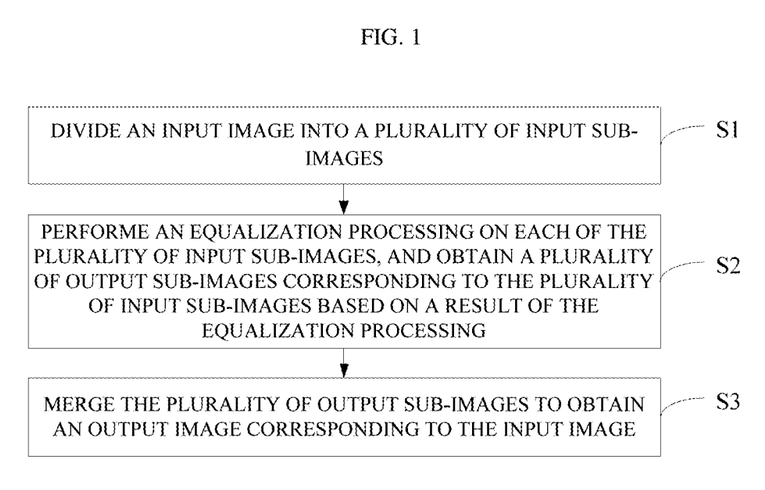
FIG. 1 illustrates a flow chart of a method for enhancing image contrast according to an embodiment of the present disclosure.

FIG. 1 illustrates a flow chart of a method for enhancing image contrast according to an embodiment of the present disclosure.

As shown in FIG. 1, the method for enhancing image contrast according to an embodiment of the present disclosure includes the following steps S1 to S3.

In step S1, an input image is divided into a plurality of input sub-images, each input sub-image corresponds to a gray value distribution range. The gray value distribution ranges of the respective input sub-images are different from each other, and each input sub-image includes all pixels, among pixels of the input image, whose gray values are within the gray value distribution range of this input sub-image.

In step S2, an equalization processing is performed on each of the plurality of input sub-images, and a plurality of output sub-images corresponding to the plurality of input sub-images are obtained based on a result of the equalization processing.

In step S3, the plurality of output sub-images are merged to obtain an output image corresponding to the input image.

Specifically, in an embodiment of the present disclosure, in step S1, the input image is divided into the plurality of input sub-images according to the gray value distribution of the pixels of the input image. Gray values of the pixels of the same input sub-image are within a same gray value distribution range, and gray values of the pixels of different input sub-images are within different gray value distribution ranges, respectively. Therefore, the equalization processing performed on each input sub-image in step S2 may be not affected by other input sub-images, such that the image contrast of the output image obtained by the method for enhancing image contrast provided by the present disclosure can be enhanced in comparison with that of the input image, and the brightness of the output image can be maintained substantially the same as that of the input image, i.e., excessive brightness of the output image can be avoided.

In some embodiments of the present disclosure, the equalization processing performed in step S2 may be a histogram equalization processing. However, the present disclosure is not limited thereto. The equalization processing performed in step S2 may be any other suitable equalization processing.

It should be noted that, the principle of the histogram equalization processing is that the gray values of the pixels of the input image which are mostly concentrated in some gray value intervals of the histogram of the input image are processed so as to be uniformly distributed throughout the gray value distribution range of the histogram of the input image. That is to say, the histogram equalization processing is to stretch the input image in a nonlinear manner, and redistribute the gray values of the pixels of the input image such that the number of pixels with any one gray value within a certain gray range is substantially the same as the number of pixels with any another gray value within the certain gray range. Therefore, by transforming the histogram of the original input image into a histogram in a form in which the gray values are uniformly distributed, the dynamic range of the gray values of the pixels of the input image is increased, thus the effect of enhancing the overall image contrast can be achieved.

Based on the principle of the histogram equalization process described above, it is easily understood that in practical applications, the distribution of gray values of the input image may be non-uniform. When there is a region in the input image where the gray values differ greatly, the histogram equalization processing is generally performed on the entire input image, which causes the gray values of all the pixels in the input image to approach a mean value. The mean value has a large deviation from the original gray values of the pixels in the region where the gray values differ greatly, and therefore the overall image contrast is seriously degraded, and the image is distorted.

In the method for enhancing image contrast provided by an embodiment of the present disclosure, the image distortion can be avoided by dividing the input image into the plurality of input sub-images and then performing histogram equalization processing on the respective input sub-images.

Figure 3:
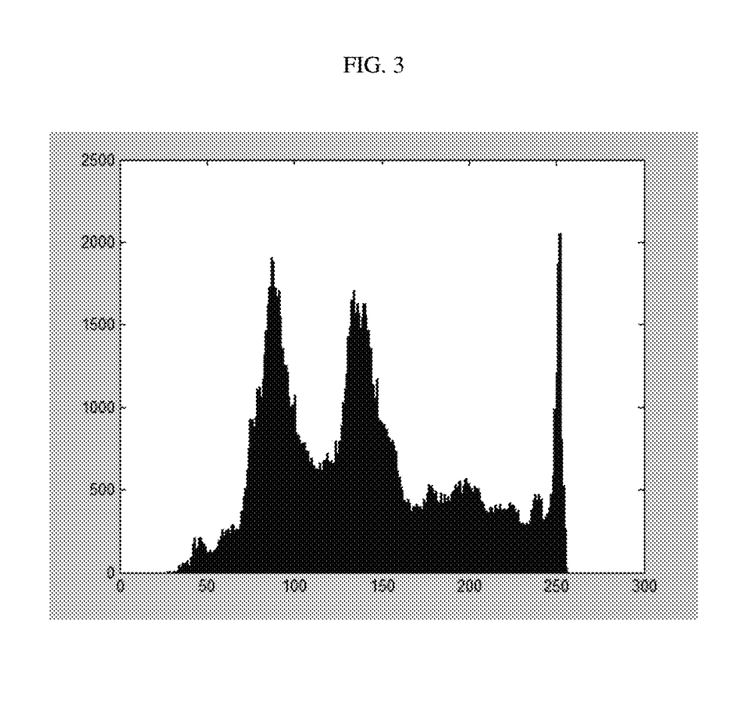
FIG. 3 illustrates a histogram of an input image according to an embodiment of the present disclosure.

FIG. 3 illustrates a histogram of an input image. By performing histogram statistics, the distribution of the pixels of the input image at respective gray values can be obtained. Specifically, taking the example shown in FIG. 3, the horizontal axis represents the gray value, and the vertical axis represents the number of the pixels of the input image at each gray value. For example, as shown in FIG. 3, the number of pixels corresponding to a gray value of 255 is 2000, that is, the number of pixels with the gray value of 255 in the input image is 2000.

The above steps S1 to S3 will be further described in detail below based on the histogram of the input image shown in FIG. 3.

Figure 2:
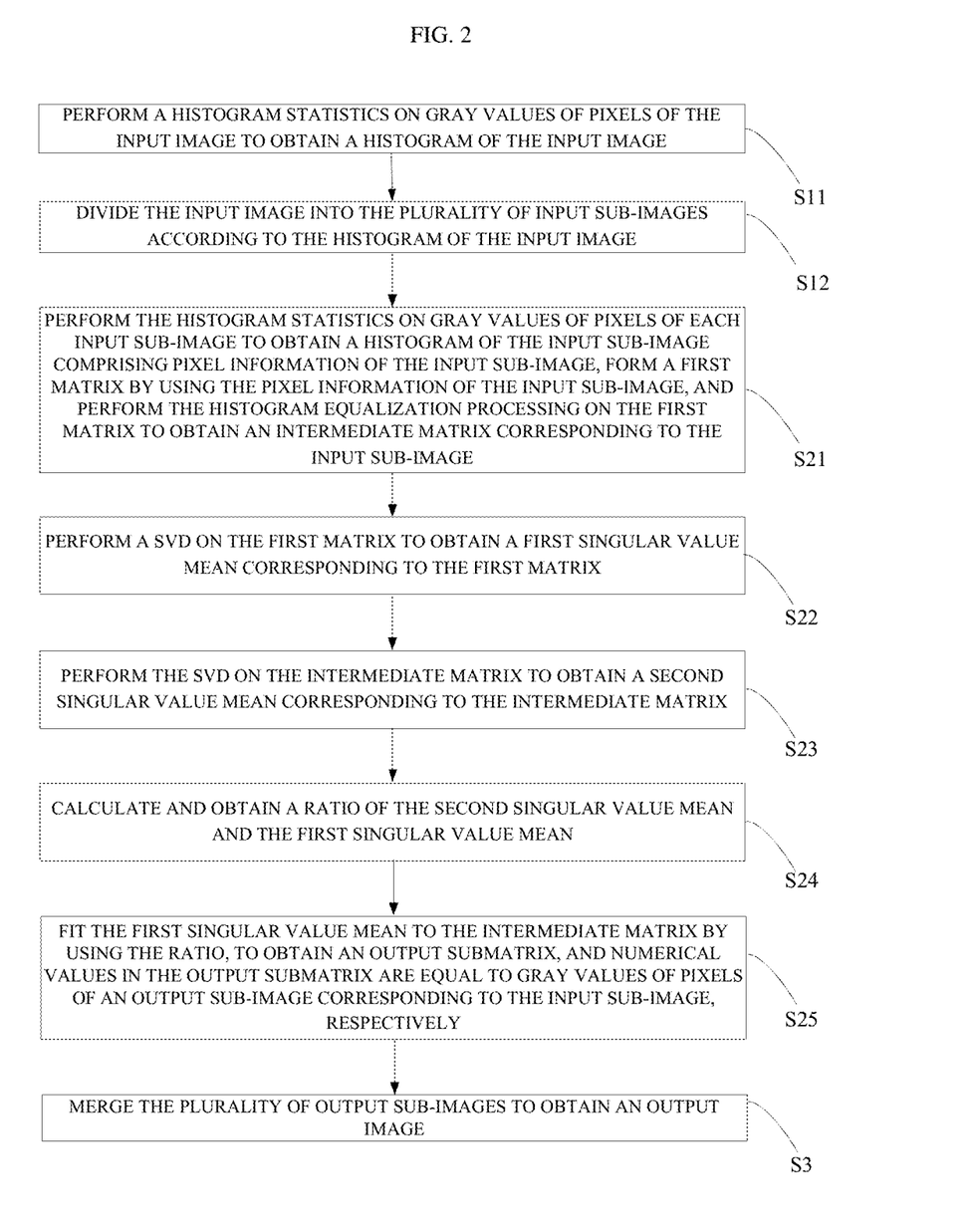
FIG. 2 illustrates a flow chart of performing an equalization processing on an input sub-image and obtaining an output sub-image based on a result of the equalization processing, in an method for enhancing image contrast according to an embodiment of the present disclosure.

FIG. 2 illustrates a flow chart of performing an equalization processing on the input sub-image and obtaining an output sub-image based on the result of the equalization processing, in the method for enhancing image contrast according to an embodiment of the present disclosure.

As shown in FIG. 2, step S1 may include the following steps S11 and S12.

In step S11, the histogram statistics is performed on the gray values of the pixels of the input image to obtain the histogram of the input image. The histogram of the input image includes pixel information of the input image, and the pixel information of the input image includes a plurality of gray values and the number of the pixels of the input image corresponding to each of the plurality of gray values.

In step S12, the input image is divided into the plurality of input sub-images according to the histogram of the input image. Each of the plurality of input sub-images corresponds to a gray value distribution range, the gray value distribution ranges of the respective input sub-images are different from each other, and each input sub-image includes all pixels, among pixels of the input image, whose gray values are within the gray value distribution range of this input sub-image.

For example, as shown in FIG. 3, in the plurality of sub-images obtained by the above steps, the gray value distribution range of one input sub-image is from 100 to 150, and thus this input sub-image includes all the pixels, among pixels of the input image, whose gray values are within the range of 100 to 150. It should be noted that, this example is only for explaining a method for dividing the input image into the plurality of input sub-images, and it should not be understood as that there must be an input sub-image with the gray value distribution range of 100-150 in the method for enhancing image contrast of the present disclosure.

In some embodiments, step S12 may include dividing, according to a division value, the input image into n input sub-images corresponding to different gray value distribution ranges, respectively. The division value is equal to a total gray value of each input sub-image and may be obtained by using the following formula (1):

$$g = \frac{1}{n}G \quad (1)$$

in which, g is the division value of each input sub-image, and G is a total gray value of the input image.

It will be appreciated that, in the process of dividing the input image into the plurality of input sub-images by using the above formula (1), it is required to calculate the total gray value G of the input image. The division value g of each input sub-image is equal to 1/n of the total gray value G of the input image. That is to say, the division values of the n input sub-images are the same. In this case, the n input sub-images obtained by performing the dividing by using the division value g have gray value distribution ranges different from each other.

It will be appreciated that, the total gray value G of the input image can be obtained by summing the gray values of all the pixels of the input image. Accordingly, the total gray value of each input sub-image can be obtained by summing the gray values of all the pixels in this input sub-image.

It should be noted that the present disclosure has no limitation on the value of n. For example, the value of n can be adaptively set according to the computing power of a device for image division.

As described above, the division value g is equal to the total gray value of each input sub-image, and the respective input sub-images have different gray value distribution ranges. It is easily understood in conjunction with FIG. 3 that, the gray values of the pixels of the input image are distributed nonuniformly, and mean value of the gray values of the pixels of each input sub-image is different from that of another input sub-image. Therefore, in the case that the input image is divided into the plurality of input sub-images by using the division value g and the total gray values (i.e., the division values g) of the respective divided input sub-images are the same, the number of the pixels of the respective input sub-images may be different from each other.

As shown in FIG. 2, step S2 may include the following steps S21 to S25.

In step S21, the histogram statistics is performed on the gray values of the pixels of each input sub-image so as to obtain a histogram of the input sub-image including pixel information of the input sub-image, and a first matrix is formed by using the pixel information of the input sub-image, the histogram equalization processing is performed on the first matrix to obtain an intermediate matrix corresponding to the input sub-image. The pixel information of the input sub-image includes: each of the gray values within the gray value distribution range of the input sub-image, and the number of the pixels of the input sub-image corresponding to each of the gray values within the gray value distribution range of the input sub-image.

In step S22, singular value decomposition (SVD) is performed on the first matrix to obtain a first singular value mean corresponding to the first matrix.

In step S23, the SVD is performed on the intermediate matrix to obtain a second singular value mean corresponding to the intermediate matrix.

In step S24, a ratio of the second singular value mean and the first singular value mean is calculated and obtained.

In step S25, the first singular value mean is fitted towards the intermediate matrix by using the ratio, to obtain an output submatrix. The numeral values in the output submatrix are equal to the gray values of the pixels in the output sub-image corresponding to the input sub-image, respectively. In other words, an image including the information in the output submatrix is the output sub-image obtained by performing the equalization processing on the input sub-image.

As described above, the principle of the histogram equalization processing has been described in the above, and will not be repeated here. Based on the principle of the histogram equalization processing, the histogram equalization processing is performed on the first matrix of the input sub-image including the pixel information of the input sub-image so as to obtain the intermediate matrix corresponding to the input sub-image.

In some embodiments, in the case that the input image is divided into n input sub-images, the above steps S22 and S23 include the following processing, in which a first matrix formed by using pixel information of an i-th input sub-image is represent by $sub\_img_i$, where i is an natural number ranged from 1 to n, a corresponding intermediate matrix obtained by performing the histogram equalization processing on the first matrix $sub\_img_i$ is represent by $sub\_img_i\_heq_i$, and the SVD is performed respectively on $sub\_img_i$ and $sub\_img_i\_heq_i$ by using the following formulas (2) and (3):

$$sub\_img_i = U_i * S_i * V_i \qquad (2)$$

$$sub\_img_i\_heq_i = U\_heq_i * S\_heq_i * V\_heq_i \qquad (3)$$

in which, $U_i$ is a k×k matrix, $S_i$ is a k×1 matrix, $V_i$ is a 1×1 matrix, $U\_heq_i$ is a k×k matrix, $S\_heq_i$ is a k×1 matrix, $V\_heq_i$ is a 1×1 matrix. $S_i$ includes a singular value of the first matrix $sub\_img_i$ formed by using the pixel information of the i-th input sub-image, and $S\_heq_i$ includes a singular value of the intermediate matrix $sub\_img_i\_heq_i$ of the i-th input sub-image.

In some embodiments, the above steps S24 and S25 include: obtaining a first singular value mean $S\_mean_i$ corresponding to $sub\_img_i$ by calculating a mean value of $S_i$; obtaining a second singular value mean $S\_heq_i\_mean_i$ corresponding to $sub\_img_i\_heq_i$ by calculating a mean value of $S\_heq_i$; and performing fitting by using the following formulas (4) and (5) so as to obtain the output submatrix $sub\_img\_out_i$ of the i-th input sub-image, i.e., a matrix including pixel information of the output sub-image corresponding to the i-th input sub-image:

$$r = S\_heq_i\_mean_i / S\_mean_i \qquad (4)$$

$$sub\_img\_out_i = U_i * (r * S_i) * V_i \qquad (5)$$

in which, r is a ratio of $S\_heq_i\_mean_i$ to $S\_mean_i$.

It will be appreciated that, since the numeral values in the output submatrix of the i-th input sub-image are equal to the gray values of the respective pixels in the output sub-images corresponding to the i-th input sub-image, the output sub-image corresponding to the i-th input sub-image can be easily obtained from the output sub-matrix $sub\_img\_out_i$ of the i-th input sub-image.

In some embodiments, in the case that the input image is divided into n input sub-images, step S3 may include: merging the output submatrices of the n output sub-images by using the following formula (6), so as to obtain an output matrix of the output image corresponding to the input image:

$$img\_out = \sum_{i=1}^{n} (\omega_i \times sub\_img\_out_i) \qquad (6)$$

in which, $\omega_i$ represents a merging weight value and $\Sigma \omega_i = 1$, img_out represents an output matrix including the pixel information of the output image, $sub\_img\_out_i$ represents the output submatrix including the pixel information of the output sub-image corresponding to the i-th input sub-image, and i represents a serial number of the input sub-image and is an natural number ranged from 1 to n.

It should be noted that, the merging weight value $\omega_i$ may be set according to different image scenarios by using multi-dataset statistics, and the output image may be obtained according to img_out. The output image has an enhanced contrast compared with the input image, and has a good overall image brightness.

Figure 4:
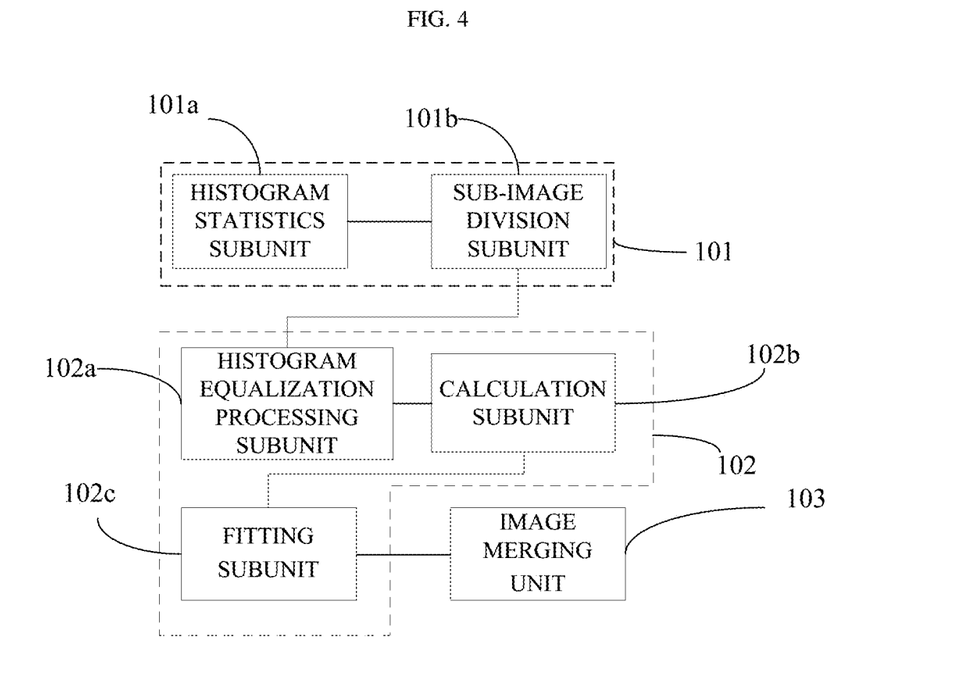
FIG. 4 illustrates a structural block diagram of a device for enhancing image contrast according to an embodiment of the present disclosure.

FIG. 4 illustrates a structural block diagram of a device for enhancing image contrast according to an embodiment of the present disclosure.

As shown in FIG. 4, the device 100 for enhancing image contrast according to the embodiment of the present disclosure includes an image division unit 101, an image equalization unit 102, and an image merging unit 103.

The image division unit 101 is configured to perform step S1, that is, is configured to divide the input image into the plurality of input sub-images according to the gray values of the pixels of the input image, each of the plurality of input sub-images corresponds to a gray value distribution range, the gray value distribution ranges of the respective input sub-images are different from each other, and each input sub-image includes all pixels, among the pixels of the input image, whose gray values are within the gray value distribution range of this input sub-image.

The image equalization unit 102 is configured to perform step S2, that is, it is configured to perform an equalization processing on each of the plurality of input sub-images, and obtain a plurality of output sub-images corresponding to the a plurality of input sub-images, respectively, based on a result of the equalization processing.

The image merging unit 103 is configured to perform step S3, that is, is configured to merge the plurality of output sub-images to obtain the output image corresponding to the input image.

As described above, instead of performing the histogram equalization processing on the overall input image (i.e., the original image to be processed) in the related art, the apparatus 100 for enhancing image contrast provided by the present disclosure: firstly, dividing the input image into the plurality of input sub-images; secondly, performing the equalization processing on each input sub-image to obtain the plurality of output sub-images in one-to-one correspondence with the plurality of input sub-images; finally, merging the plurality of obtained output sub-images to obtain the output image corresponding to the input image. Therefore, compared to the related art, the output image obtained by the apparatus 100 for enhancing image contrast provided by the present disclosure has an enhanced contrast, and has a good overall image brightness.

In some embodiments, the image division unit 101 may include a histogram statistics subunit 101a and a sub-image division subunit 101b.

The histogram statistics subunit 101a is configured to perform the histogram statistics on the gray values of the pixels of the input image to obtain the histogram of the input image. The histogram of the input image includes the pixel information of the input image, and the pixel information of the input image includes the plurality of gray values and the number of the pixels of the input image corresponding to each of the gray values.

The sub-image division subunit 101b is configured to divide the input image into the plurality of input sub-images according to the histogram of the input image.

In some embodiments, the sub-image division subunit 101b is configured to: divide, according to the division value, the input image into n input sub-images corresponding to different gray value distribution ranges, respectively. The division value is equal to the total gray value of each input sub-image and may be obtained by using the following formula (1):

$$g = \frac{1}{n} G \quad (1)$$

in which, g is the division value of each input sub-image, and G is the total gray value of the input image.

In some embodiments, the image equalization unit 102 includes a histogram equalization processing subunit 102a, a calculation subunit 102b, and a fitting subunit 102c.

The histogram equalization processing subunit 102a is configured to: perform the histogram statistics on the gray values of the pixels of each input sub-image to obtain the histogram of the input sub-image including the pixel information of the input sub-image, form a first matrix by using the pixel information of the input sub-image, and perform the histogram equalization processing on the first matrix to obtain an intermediate matrix corresponding to the input sub-image. The pixel information of the input sub-image includes each of the gray values within the gray value distribution range of the input sub-image and the number of the pixels of the input sub-image corresponding to each of the gray values within the gray value distribution range.

The calculation subunit 102b is configured to: perform the SVD on the first matrix to obtain a first singular value mean corresponding to the first matrix, perform the SVD on the intermediate matrix to obtain a second singular value mean corresponding to the intermediate matrix, and calculate and obtain a ratio of the second singular value mean and the first singular value mean.

The fitting subunit 102c is configured to: fit the first singular value mean towards the intermediate matrix by using the ratio, to obtain an output submatrix. The numerical values in the output submatrix are equal to the gray values of the pixels in an output sub-image corresponding to the input sub-image, respectively.

In some embodiments, based on the principle of the histogram equalization processing, the histogram equalization processing is performed on the first matrix of the input sub-image including the pixel information of the input sub-image so as to obtain the intermediate matrix corresponding to the input sub-image.

In some embodiments, in the case that the input image is divided into n input sub-images, the performing SVD on the first matrix and the intermediate matrix includes the following processing, in which the first matrix formed by using the pixel information of the i-th input sub-image is represent by sub_img$_i$, where i is an natural number ranged from 1 to n, the corresponding intermediate matrix obtained by performing the histogram equalization processing on the first matrix sub_img$_i$ is represent by sub_img$_i$_heq$_i$, and the SVD is performed respectively on sub_img$_i$ and sub_img$_i$_heq$_i$ by using the following formulas (2) and (3):

$$sub\_img_i = U_i * S_i * V_i \quad (2)$$

$$sub\_img_i\_heq_i = U\_heq_i * S\_heq_i * V\_heq_i \quad (3)$$

in which, $U_i$ is a k×k matrix, $S_i$ is a k×1 matrix, $V_i$ is a 1×1 matrix, $U\_heq_i$ is a k×k matrix, $S\_heq_i$ is a k×1 matrix, $V\_heq_i$ is a 1×1 matrix. $S_i$ includes the singular value of the first matrix sub_img$_i$ formed by using the pixel information of the i-th input sub-image, and $S_i\_heq_i$ includes the singular value of the intermediate matrix sub_img$_i$_heq$_i$ of the i-th input sub-image.

In some embodiments, the above calculating and obtaining the ratio of the second singular value mean and the first singular value mean, and fitting the first singular value mean towards the intermediate matrix by using the ratio so as to obtain the output submatrix includes: obtaining the first singular value mean S_mean$_i$ corresponding to sub_img$_i$ by calculating the mean value of $S_i$; obtaining the second singular value mean S_heq$_i$_mean$_i$ corresponding to sub_img$_i$_heq$_i$ by calculating the mean value of S_heq$_i$; and then performing fitting by using the the following formulas (4) and (5) so as to obtain the output submatrix sub_img_out$_i$ of the i-th input sub-image, i.e., the matrix including the pixel information of the output sub-image corresponding to the i-th input sub-image:

$$r = S\_heq_i\_mean_i / S\_mean_i \quad (4)$$

$$sub\_img\_out_i = U_i * (r * S_i) * V_i \quad (5)$$

in which, r is the ratio of S_heq$_i$_mean$_i$ to S_mean$_i$.

In some embodiments, the merging the plurality of output sub-images by the image merging unit 103 to obtain the output image corresponding to the input image may include: merging the output submatrices of the n output sub-images by using the following formula (6), so as to obtain the output matrix of the output image corresponding to the input image:

$$img\_out = \sum_{i=1}^{n} (\omega_i \times sub\_img\_out_i) \quad (6)$$

in which, $\omega_i$ represents a merging weight value and $\Sigma\omega_i = 1$, img_out represents an output matrix including the pixel information of the output image, sub_img_out$_i$ represents the output submatrix including the pixel information of the output sub-image corresponding to the i-th input sub-image, and i represents the serial number of the input sub-image, and is an natural number ranged from 1 to n.

Since the numbers of the pixels of the respective output sub-images may be different from each other, a method of zero-padding in an output submatrix of an output sub-image having fewer pixels may be adopted, such that the output submatrices of all the output sub-images have the same number of elements.

It should be noted that, the merging weight value $\omega_i$ may be set according to different image scenarios by using multi-dataset statistics, and the output image may be obtained according to img_out. The output image has an enhanced contrast compared with the input image, and has a good overall image brightness.

It should be noted that the units or modules involved in the device for enhancing image contrast provided by the present disclosure may be implemented by software, hardware, or a combination thereof. The described units or modules may also be provided in a processor. For example, the units may be software programs disposed in a computer or a mobile smart device, or may be a separately configured hardware device. The names of these units or modules are not a limitation to the units or modules.

An embodiment of the present disclosure further provides a display apparatus which includes a display panel and any of the devices for enhancing image contrast according to the embodiments of the present disclosure.

As described above, since the display apparatus includes the device for enhancing image contrast provided by the present disclosure, an image displayed by the display apparatus has an enhanced contrast compared with the original input image, and has a good overall image brightness, i.e., excessive brightness of the image displayed by the display apparatus can be avoided.

An embodiment of the present disclosure further provides an apparatus which includes at least one processor and a memory for storing at least one program. When the at least one program is executed by the at least one processor, the at least one processor performs the method for enhancing image contrast according to an embodiment of the present disclosure.

An embodiment of the present disclosure further provides a computer-readable storage medium storing a computer program thereon. When the program is executed by a processor, the processor performs the method for enhancing image contrast according to an embodiment of the present disclosure.

It will be appreciated that the above implementations are only exemplary implementations for illustrating the principle of the present disclosure. However, the present disclosure is not limited thereto. An ordinary person skilled in the art can make various modifications and improvements to the present disclosure without departing from the spirit and essence of the present disclosure. These modifications and improvements should be also considered within the protective scope of the present disclosure.

What is claimed is:

1. A method for enhancing image contrast, comprising:
dividing an input image into a plurality of input sub-images, each of the plurality of input sub-images corresponding to a gray value distribution range, the gray value distribution ranges of the respective input sub-images being different from each other, and each input sub-image comprising all pixels, among pixels of the input image, whose gray values are within the gray value distribution range of the input sub-image;
performing an equalization processing on each of the plurality of input sub-images, and obtaining a plurality of output sub-images corresponding to the plurality of input sub-images, respectively, based on a result of the equalization processing; wherein the step of diving the input image into the plurality of input sub-images comprises:
merging the plurality of output sub-images to obtain an output image corresponding to the input image;
performing a histogram statistics on gray values of the pixels of the input image to obtain a histogram of the input image, wherein the histogram of the input image indicates a total gray value distribution range of the input image and comprises pixel information of the input image, and the pixel information of the input image comprises a plurality of gray values and the number of pixels of the input image corresponding to each of the plurality of gray values; and
dividing, according to the histogram of the input image, the input image into the plurality of input sub-images, wherein the step of dividing, according to the histogram of the input image, the input image into the plurality of input sub-images comprises:
dividing, according to the histogram of the input image, the input image into n input sub-images respectively corresponding to different gray value distribution ranges, such that a total gray value of each input sub-image is the same, the total gray value of each input sub-image is obtained by using the following formula (1):

$$g = (1/n)G \tag{1}$$

where g is the total gray value of each input sub-image and is obtained by summing gray values of all pixels in the input sub-image, and G is a total gray value of the input image and is obtained by summing gray values of all pixels of the input image.

2. The method of claim 1, wherein the step of performing the equalization processing on each of the plurality of input sub-images, and obtaining the plurality of output sub-images corresponding to the plurality of input sub-images, respectively, based on the result of the equalization processing comprises:
performing the histogram statistics on the gray values of the pixels of each input sub-image to obtain a histogram of the input sub-image, wherein the histogram of the input sub-image comprises pixel information of the input sub-image, and the pixel information of the input sub-image comprises each of gray values within the gray value distribution range of the input sub-image and the number of pixels of the input sub-image corresponding to each of the gray values within the gray value distribution range;
forming a first matrix by using the pixel information of the input sub-image;
performing a histogram equalization processing on the first matrix to obtain an intermediate matrix corresponding to the input sub-image;
performing a singular value decomposition (SVD) on the first matrix to obtain a first singular value mean corresponding to the first matrix;
performing the SVD on the intermediate matrix to obtain a second singular value mean corresponding to the intermediate matrix;
calculating and obtaining a ratio of the second singular value mean and the first singular value mean; and
fitting the first singular value mean towards the intermediate matrix by using the ratio, to obtain an output submatrix, numerical values in the output submatrix being equal to gray values of pixels of an output sub-image corresponding to the input sub-image, respectively.

3. The method of claim 2, wherein the steps of performing the SVD on the first matrix and the intermediate matrix comprise:
performing, in a case that the input image is divided into the n input sub-images, the SVD on $sub\_img_i$ and $sub\_img_i\_heq_i$ by using the following formulas (2) and (3):

$$sub\_img_i = U_i * S_i * V_i \tag{2}$$

$$sub\_img_i\_ = U\_heq_i * S\_heq_i * V\_heq_i \tag{3}$$

wherein i represents a serial number of the input sub-image, and is a natural number ranged from 1 to n, $sub\_img_i$ represents the first matrix formed by using pixel information of an i-th input sub-image, $sub\_img_i\_heq_i$ represents the intermediate matrix obtained by performing the histogram equalization processing on $sub\_img_i$, $U_i$ is a k×k matrix, $S_i$ is a k×1 matrix, $V_i$ is a 1×1 matrix, $U\_heq_i$ is a k×k matrix, $S\_heq_i$ is a k×1 matrix, $V\_heq_i$ is a 1×1 matrix, $S_i$ comprises a singular value of $sub\_img_i$, and $S\_heq_i$ comprises a singular value of $sub\_img_i\_heq_i$.

4. The method of claim 3, wherein the step of calculating and obtaining the ratio of the second singular value mean and the first singular value mean comprises:

obtaining the first singular value mean $S\_mean_i$ corresponding to $sub\_img_i$ by calculating a mean value of $S_i$;

obtaining the second singular value mean $S\_heq_i\_mean_i$ corresponding to $sub\_img_i\_heq_i$ by calculating a mean value of $S\_heq_i$; and obtaining the ratio of the second singular value mean and the first singular value mean by using the following formula (4):

$$r = S\_heq_i\_mean_i / S\_mean_i \qquad (4)$$

wherein r is the ratio of $S\_heq_i\_mean_i$ to $S\_mean_i$, and

The step of fitting the first singular value mean towards the intermediate matrix by using the ratio, to obtain the output submatrix comprises:

obtaining the output submatrix $sub\_img\_out_i$ of the i-th input sub-image by using the following formula (5), the output submatrix $sub\_img\_out_i$ including pixel information of the output sub-image corresponding to the i-th input sub-image:

$$sub\_img\_out_i = U_i * (r * S_i) * V_i \qquad (5).$$

5. The method of claim 4, wherein the step of merging the plurality of output sub-images to obtain the output image corresponding to the input image comprises:

merging output submatrices of the n output sub-images by using the following formula (6) to obtain an output matrix of the output image corresponding to the input image:

$$img\_out = \sum_{i=1}^{n} (\omega_i \times sub\_img\_out_i) \qquad (6)$$

wherein $\omega_i$ represents a merging weight value and $\Sigma\omega_i=1$, and img_out represents the output matrix including pixel information of the output image.

6. A device for enhancing image contrast comprising:

an image division unit configured to divide an input image into a plurality of input sub-images according to gray values of pixels of the input image, each of the plurality of input sub-images corresponding to a gray value distribution range, the gray value distribution ranges of the respective input sub-images being different from each other, and each input sub-image comprising all pixels, among the pixels of the input image, whose gray values are within the gray value distribution range of the input sub-image;

an image equalization unit configured to perform an equalization processing on each of the plurality of input sub-images, and obtain a plurality of output sub-images corresponding to the plurality of input sub-images, respectively, based on a result of the equalization processing;

an image merging unit configured to merge the plurality of output sub-images to obtain an output image corresponding to the input image, wherein the image division unit comprises:

a histogram statistics subunit configured to perform a histogram statistics on the gray values of the pixels of the input image to obtain a histogram of the input image, wherein the histogram of the input image indicates a total gray value distribution range of the input image and comprises pixel information of the input image, and the pixel information of the input image comprises a plurality of gray values and the number of pixels of the input image corresponding to each of the plurality of gray values; and a sub-image division subunit configured to divide the input image into the plurality of input sub-images according to the histogram of the input image, wherein the subimage division subunit is configured to:

divide the input image into n input sub-images respectively corresponding to different gray value distribution ranges according to the histogram of the input images, such that a total gray value of each input sub-image is the same, the total gray value of catch input sub-image is obtained by using the following formula (1):

$$g = (1/n)G \qquad (1)$$

wherein g is the total gray value of each input sub-image and is obtained by summing gray values of all pixels in the input sub-image, and G is a total gray value of the input image and is obtained by summing gray values of all pixels of the input image.

7. An apparatus comprising:
at least one processor; and
a memory for storing at least one computer program;
wherein when the at least one computer program is executed by the at least one processor, the at least one processor performs the method for enhancing image contrast of claim 1.

8. A non-transitory computer-readable storage medium encoded with a computer program, wherein when the computer program is executed by a processor, causes the processor to perform the method for enhancing image contrast of claim 1.

9. The device of claim 6, wherein the image equalization unit comprises:

a histogram equalization processing subunit configured to:

perform the histogram statistics on the gray values of the pixels of each input sub-image to obtain a histogram of the input sub-image comprising pixel information of the input sub-image, wherein the pixel information of the input sub-image comprises each of gray values within the gray value distribution range of the input sub-image and the number of pixels of the input sub-image corresponding to each of the gray values within the gray value distribution range;

form a first matrix by using the pixel information of the input sub-image; and perform a histogram equalization processing on the first matrix to obtain an intermediate matrix corresponding to the input sub-image;

a calculation subunit configured to:

perform a singular value decomposition (SVD) on the first matrix to obtain a first singular value mean corresponding to the first matrix;

perform the SVD on the intermediate matrix to obtain a second singular value mean corresponding to the intermediate matrix; and calculate and obtain a ratio of the second singular value mean and the first singular value mean; and a fitting subunit configured to fit the first singular value mean towards the intermediate matrix by using the ratio, to obtain an output submatrix, numerical values in the output submatrix being equal to gray values of pixels of an output sub-image corresponding to the input sub-image, respectively.

10. The device of claim 9, wherein the calculation subunit is configured to:

perform, in a case that the input image is divided into the n input sub-images, the SVD on $sub\_img_i$ and $sub\_img_i\_heq_i$ by using the following formulas (2) and (3):

$$sub\_img_i = U_i * S_i * V_i \quad (2)$$

$$sub\_img_{i\_} = U\_heq_i * S\_heq_i * V\_heq_i \quad (3)$$

wherein i represents a serial number of the input sub-image, and is a natural number ranged from 1 to n, $sub\_img_i$ represents the first matrix formed by using pixel information of an i-th input sub-image, $sub\_img_{i\_}heq_i$ represents the intermediate matrix obtained by performing the histogram equalization processing on $sub\_img_i$, $U_i$ is a k×k matrix, $S_i$ is a k×1 matrix, $V_i$ is a 1×1 matrix, $U\_heq_i$ is a k×k matrix, $S\_heq_i$ is a k×1 matrix, $V\_heq_i$ is a 1×1 matrix, $S_i$ comprises a singular value of $sub\_img_i$, and $S\_heq_i$ includes a singular value of $sub\_img_{i\_}heq_i$.

11. The device of claim 10, wherein the calculation subunit is configured to:

obtain the first singular value mean $S\_mean_i$ corresponding to $sub\_img_i$, by calculating a mean value of $S_i$;

obtain the second singular value mean $S\_heq_i\_mean_i$ corresponding to $sub\_img_{i\_}heq_i$ by calculating a mean value of $S\_heq_i$; and obtain the ratio of the second singular value mean and the first singular value mean by using the following formula (4):

$$r = S\_heq_i\_mean_i / S\_mean_i \quad (4)$$

wherein r is the ratio of $S\_heq_i\_mean_i$ to $S\_mean_i$; and the fitting subunit is configured to:

obtain the output submatrix $sub\_img\_out_i$ of the i-th input sub-image by using the following formula (5), the output submatrix $sub\_img\_out_i$ comprising pixel information of the output sub-image corresponding to the i-th input sub-image:

$$sub\_img\_out_i = U_i * (r * S_i) * V_i \quad (5).$$

12. The device of claim 11, wherein the image merging unit is configured to:

merge output submatrices of the n output sub-images by using the following formula (6) to obtain an output matrix of the output image corresponding to the input image:

$$img\_out = \sum_{i=1}^{n} (\omega_i \times sub\_img\_out_i) \quad (6)$$

wherein $\omega_i$ represents a merging weight value and $\Sigma\omega_i = 1$, and img_out represents the output matrix comprising pixel information of the output image.

13. A display apparatus comprising a display panel and the device for enhancing image contrast of claim 6.

* * * * *